(No Model.)
J. W. WETMORE.
VEHICLE ROAD SCRAPER.
No. 532,852. Patented Jan. 22, 1895.
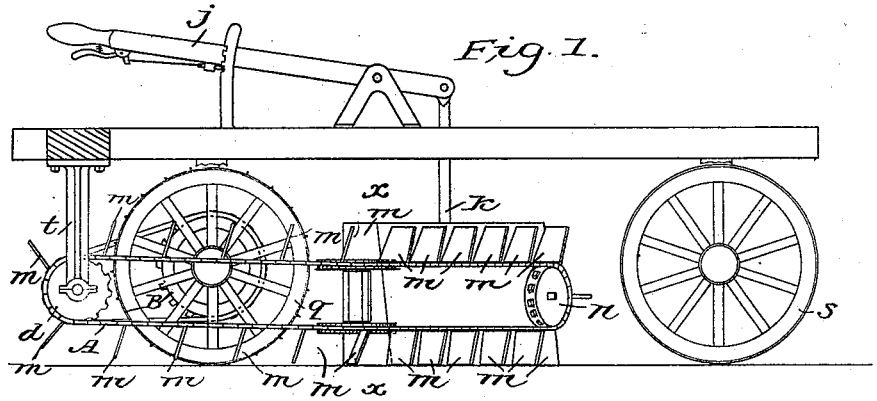
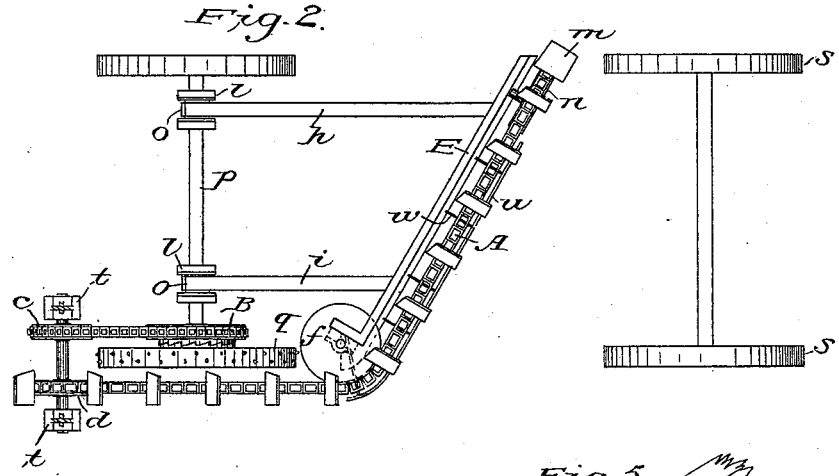
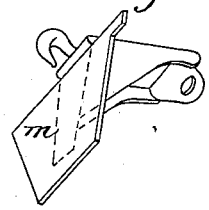
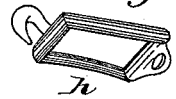
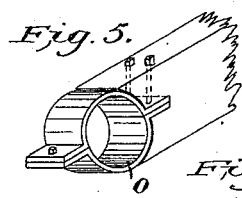
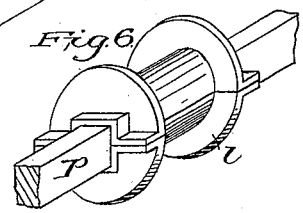
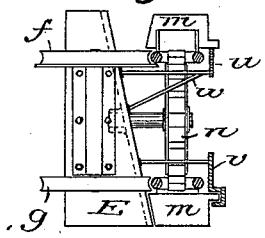
Witnesses.
Paul Mueller
C. N. Faulkner
Inventor.
Jerome W. Wetmore

UNITED STATES PATENT OFFICE.

JEROME W. WETMORE, OF ERIE, PENNSYLVANIA.

VEHICLE ROAD-SCRAPER.

SPECIFICATION forming part of Letters Patent No. 532,852, dated January 22, 1895.

Application filed March 26, 1894. Serial No. 505,102. (No model.)

*To all whom it may concern:*

Be it known that I, JEROME W. WETMORE, a citizen of the United States, residing at Erie, in the county of Erie and State of Pennsylvania, have invented certain new and useful Improvements in Vehicle Road-Scrapers; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to the supplemental means of carrying the earth from before the oblique wagon road scraper, toward the middle of the road.

The present reliance to move the earth toward the middle of the road is the oblique action of the scraper on the accumulation before it. This leads to a large body of earth being carried forward and great power expended on account of the inclination of the propelling force toward the middle, especially if the nature and condition of the material are such as to adhere to the scraper and its particles do not move among each other.

The object of my invention is to apply force to move the material, in a line parallel with the scraper so as to bring it more readily to the points to which it is required to be moved. I attain this object by the mechanism illustrated in the accompanying drawings, in which—

Figure 1, is a side view of the construction; Fig. 2, a vertical or plan view of the principal parts; Fig. 3, one of the smaller scrapers as attached to one of the links in the rag chain; Fig. 4, one of the links intermediate between the links carrying the scrapers; Fig. 5, the journal box of the beam $h$; Fig. 6, the journal formed on the hind axle. This connection may be by a strap and hinge in front of the axle. Fig. 7 is a cross section through $x, x$, Fig. 1, showing also the face view of wheel $n$.

A, is the rag chain carrying the small scrapers; B, the sprocket wheel journaled on the hind axle and made to turn with the main wheel, $q$, by a clutch; C, a sprocket wheel turned by the rag chain connecting with B; $d$, a sprocket wheel on the shaft with C, by which the rag chain A, is operated; E, the main scraper attached obliquely to the vehicle; $f, g$, Figs. 2 and 7, friction grooved wheels around the upper of which the rag chain passes in going forward and the lower in returning; $h, i$, part of the frame work of the vehicle hinged to the hind axle and the large scraper, E, $j, k$.

By means of hand levers $j, k$, the forward end of E, is raised and lowered and by means of $i$, and a similar lever, the hind end of E, is raised and lowered.

$l$, Figs. 2 and 6, represents the flanges of the bearing for $h$ and $i$; $m$, the smaller scrapers attached to the rag chain; $n$, the forward sprocket wheel; $o$, the hinges of $h$ and $i$, on the axle; $p$, the axle; $q$, the rim of one of the wheels of the vehicle with projections on its face to increase the friction.

$r$, Fig. 4, represents the curves in the sides of the links of the rag chain made to conform to the rims of the friction wheels, $f$ and $g$; $s$, the forward wheels of the vehicle which carry the scrapers.

$t$, Figs. 1 and 2, represents the supports of the shafts of the wheels, C and $d$; $u$, the supports of the outer ends of the smaller scrapers when moving forward; $v$, the supports of the outer ends of the same when moving backward, its common bracing not fully shown; $w$, the angular supports of W and V, attached to the main scraper frame. This support may come from the frame work above; $x, x$, line of a section for Fig. 7.

The operation of the machine is as follows: When the vehicle is moved forward, the main scraper will accumulate the earth before it and incline it backward. The smaller scrapers operated by the rag chain A, and sprocket wheels B, C and $d$, will carry the earth parallel with the main scraper toward the middle of the road.

Timbers, bracing and gearing of the vehicle are omitted as they would obstruct the view of the essential parts of the structure.

The small scrapers may be curved or cup shaped resembling those on grain elevators to prevent the earth from dropping away from them too much.

What I claim is—

1. In the vehicle road scraper, the series of co-operative scrapers running parallel with the main oblique scraper and independent thereof, substantially as described for the purpose set forth.

2. In the vehicle road scraper, the series of co-operative scrapers on an endless rag chain running parallel with the main oblique scraper, substantially as described for the purpose set forth.

3. In the vehicle road scraper, the sprocket wheels B, C, $d$, and, $n$, in combination with the rag chain A, friction wheels, $f$, and scrapers E, and, $m$, substantially as set forth.

4. In the vehicle road scraper, the scraper link Fig. 3 in the rag chain in combination with the sprocket and friction wheels and the driving wheel $q$ substantially as described for the purpose set forth.

5. In the vehicle road scraper, the endless chain links with sides curved toward the friction wheels, $f$, as shown in Fig. 4 in combination with the sprocket and driving wheels substantially as described.

In testimony whereof I affix my signature in presence of two witnesses.

JEROME W. WETMORE.

Witnesses:
PAUL MUELLER,
C. N. FAULKNER.